US011796382B2

(12) United States Patent
Johnston et al.

(10) Patent No.: US 11,796,382 B2
(45) Date of Patent: Oct. 24, 2023

(54) DRIFT CORRECTION IN A FIBER OPTIC DISTRIBUTED ACOUSTIC SENSING SYSTEM

(71) Applicants: William Albert Johnston, Houston, TX (US); Alexander Michael Barry, Cypress, TX (US)

(72) Inventors: William Albert Johnston, Houston, TX (US); Alexander Michael Barry, Cypress, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 576 days.

(21) Appl. No.: 16/690,950

(22) Filed: Nov. 21, 2019

(65) Prior Publication Data

US 2021/0156734 A1    May 27, 2021

(51) Int. Cl.
| | | |
|---|---|---|
| *G01H 9/00* | (2006.01) | |
| *G01V 1/44* | (2006.01) | |
| *G02B 6/02* | (2006.01) | |
| *E21B 47/135* | (2012.01) | |

(52) U.S. Cl.
CPC .......... *G01H 9/004* (2013.01); *E21B 47/135* (2020.05); *G01V 1/44* (2013.01); *G02B 6/02342* (2013.01); *G01V 2210/1429* (2013.01)

(58) Field of Classification Search
CPC ........ G01H 9/004; E21B 47/135; G01V 1/44; G01V 2210/1429; G02B 6/02342
See application file for complete search history.

(56) References Cited

U.S. PATENT DOCUMENTS

| 10,451,475 | B2 * | 10/2019 | Dean ...................... G01H 9/004 |
| 2005/0078316 | A1 | 4/2005 | Ronnekleiv et al. |
| 2005/0088660 | A1 | 4/2005 | Ronnekleiv |
| 2015/0014521 | A1 * | 1/2015 | Barfoot .................... G01V 5/04 |
| | | | 250/261 |
| 2017/0299508 | A1 | 10/2017 | Jin et al. |

FOREIGN PATENT DOCUMENTS

| CN | 105092014 A | 11/2015 | |
| EP | 3321901 A1 * | 5/2018 | ............. G01H 9/004 |
| WO | WO-9524663 A1 * | 9/1995 | ............... G01V 3/28 |

OTHER PUBLICATIONS

Notification of Transmittal and International Search Report and Written Opinion; PCT/US2020/060683; Korean Intellectual Property Office; dated Mar. 2, 2021.

* cited by examiner

*Primary Examiner* — Isam A Alsomiri
*Assistant Examiner* — Abdallah Abulaban
(74) *Attorney, Agent, or Firm* — CANTOR COLBURN LLP

(57) ABSTRACT

An apparatus for sensing acoustic energy in a borehole penetrating the earth includes an optical interrogator and a sensing optical fiber having a length Ls optically coupled to the optical interrogator and configured to sense the acoustic energy to provide sensed acoustic data. The apparatus also includes a reference optical fiber having a length Lr optically coupled to the optical interrogator to provide reference data, wherein the optical interrogator corrects the sensed acoustic data using the reference data to provide corrected sensed acoustic data.

21 Claims, 3 Drawing Sheets

DRIFT CORRECTION IN A FIBER OPTIC DISTRIBUTED ACOUSTIC SENSING SYSTEM

BACKGROUND

Boreholes are typically drilled into earth formations to explore for and extract hydrocarbons. Once a reservoir of hydrocarbons is discovered, borehole completion activities are required before the hydrocarbons can be extracted.

Some borehole completion activities include disposing completion equipment, material or structures into a borehole. For example, the borehole may be lined with a casing that is then cemented in place. In another example, acid may be disposed in the casing in order to open up any obstructions in perforations in the casing to allow the flow of hydrocarbons. Many of these downhole completion activities need to be monitored by a completion specialist at the surface of the earth in order to ensure that an activity is working or has been completed correctly.

One way of monitoring the downhole completion activities is to monitor acoustic energy emitted by those activities using fiber optic distributed acoustic sensors disposed downhole. Unfortunately, acoustic measurements made by the fiber optic distributed acoustic sensors may be subject to drift due to frequency or wavelength drift in a light source that illuminates the optical fiber. Hence, improvements in the accuracy of fiber optic measurements would be well received in the hydrocarbon production industry.

BRIEF SUMMARY

Disclosed is an apparatus for sensing acoustic energy in a borehole penetrating the earth. The apparatus includes: an optical interrogator; a sensing optical fiber having a length Ls optically coupled to the optical interrogator and configured to sense the acoustic energy to provide sensed acoustic data; and a reference optical fiber having a length Lr optically coupled to the optical interrogator to provide reference data; wherein the optical interrogator corrects the sensed acoustic data using the reference data to provide corrected sensed acoustic data.

Also disclosed is a method for sensing acoustic energy in a borehole penetrating the earth. The method includes: obtaining sensed acoustic data from a sensing optical fiber having a length Ls disposed in the borehole using an optical interrogator optically coupled to sensing optical fiber; obtaining reference data from a reference optical fiber having a length Lr using the optical interrogator that is optically coupled to the reference optical fiber; and correcting the sensed acoustic data using the reference data to provide corrected sensed acoustic data.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are embodiments of apparatuses and methods for sensing acoustic energy in a borehole penetrating the earth. The acoustic energy may include sound waves and/or seismic waves for seismic monitoring purposes. The embodiments involve disposing a sensing optical fiber responsive to the acoustic energy in the borehole. In general, the optical fiber is responsive to the acoustic energy due to Rayleigh scattering in which reflective imperfections in the optical fiber scatter or reflect light according to a spacing between the reflective imperfections. Thus, as a value of a sensed parameter changes, the spacing between the reflective imperfections changes resulting in a change to the reflected light which can be measured to sense a value of the parameter or a change in the value of the parameter. However, in some embodiments the optical fiber may be inscribed with fiber Bragg gratings (FBGs) that are responsive to the acoustic energy such that a spacing between the FBGs changes in response to a change in the value of the parameter being sensed. Other optical sensing techniques may also be used. A light source such as a laser illuminates the optical fiber to sense or measure the acoustic energy. However, the wavelength (or frequency which may be used interchangeably with wavelength) of the light emitted by the light source may drift resulting in an acoustic energy measurement that is not accurate. As disclosed herein, a length of stabilized reference optical fiber is also illuminated by the light source and reference data from this reference optical fiber is used to correct the degraded data obtained from the optical fiber sensing the acoustic energy. As the stabilized reference optical fiber is not exposed to acoustic energy or is exposed to very little acoustic energy as compared to the sensing optical fiber, any deviation in measurements of the stabilized reference optical fiber is due to a drift in wavelength of the light emitted by the light source. As a result, measurements of the parameter are corrected to account for wavelength drift of the emitted light to improve accuracy of those measurements.

Figure 1:
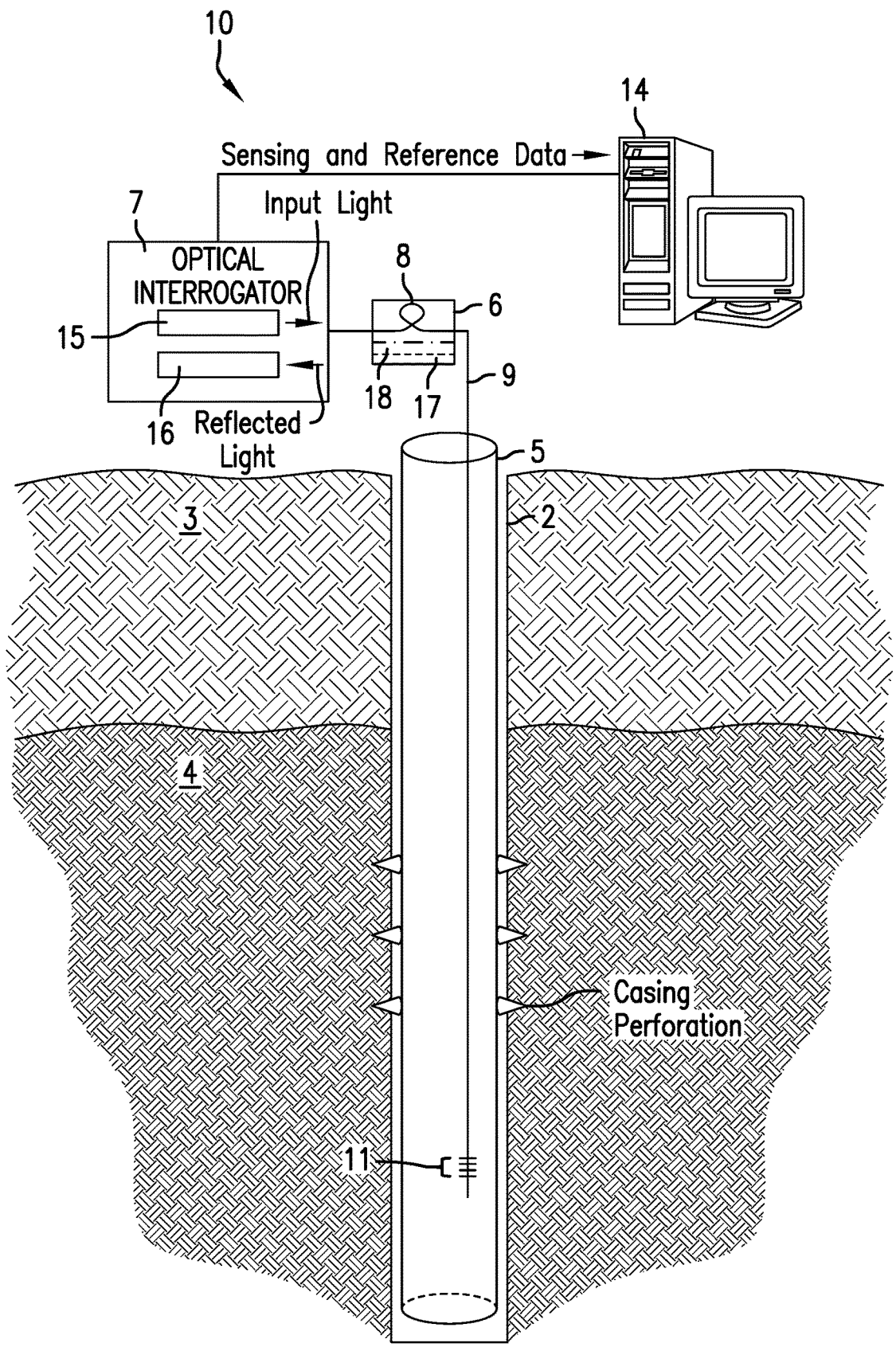
FIG. 1 illustrates a cross-sectional view of an embodiment of optical fiber distributed acoustic sensors disposed in a borehole penetrating the earth.

FIG. 1 illustrates a cross-sectional view of a borehole 2 penetrating the earth 3 having a formation 4, which contains a reservoir of hydrocarbons. The borehole 2 is lined with a casing 5. The casing 5 may have perforations to allow hydrocarbons to flow into the casing 5 where they are pumped to the surface for production purposes. A distributed acoustic sensing (DAS) system 10 is configured to sense acoustic energy at distributed locations downhole. The DAS system 10 includes an optical interrogator 7, a length of stabilized reference optical fiber 8, and a sensing optical fiber 9. The sensing optical fiber 9 generally includes reflective imperfections that result in Rayleigh scattering for sensing acoustic energy at the distributed locations along the sensing optical fiber 9. In an alternative embodiment, the sensing optical fiber 9 may include fiber Bragg gratings (FBGs) 11. The length of stabilized reference optical fiber 8 also includes reflective imperfections for Rayleigh scattering and may also include FBGs 11 if they are used in the sensing optical fiber 9. The term "stabilized" relates to the reference optical fiber 8 being in a state of not being subjected to acoustic energy or to being subjected to very low amounts of acoustic energy that are not measurably significant (e.g., less than one percent) compared to the acoustic energy being measured by the sensing optical fiber 9. In other words, the stabilized reference optical fiber 8 is held in a strain-free and vibration-isolated environment. In one or more embodiments, the stabilized reference optical fiber 8 may be in the form of a coil for compactness and stored in a stabilizing chamber 6 that provides the strain-free and vibration-isolated environment in addition to a temperature stabilized environment. As such, the stabilizing chamber 6 may be lined with or include acoustic energy damping material 18 and insulation 17.

The optical interrogator 7 is configured to interrogate both the length of reference optical fiber 8 and the sensing optical fiber 9 to determine strain values and their locations. The interrogation is performed by transmitting input light from a light source 15, which can be a laser, into the stabilized reference optical fiber 8 that is in series with the sensing optical fiber 9. Light reflected in both the stabilized reference optical fiber 8 and the sensing optical fiber 9 is received by the optical interrogator 7 and generates an interference pattern that is detected by a photo-detector 16. The reflective imperfections for Rayleigh scattering reflect the input light. The reflective imperfections have a "normal" or reference spacing of the imperfections. As each reflective imperfection is exposed to acoustic energy or waves, the imperfections may experience a shift in spacing between them from the normal spacing based on a magnitude or intensity of the strain imparted to the corresponding section of the optical fiber by the acoustic waves. The shift in spacing then results in a change in the interference pattern established in the optical interrogator 7, which is then correlated to a measured value. In one or more embodiments, the optical interrogator 7 may perform Optical Time Domain Reflectometry (OTDR) as is known in the art. Other known reflectometry methods may also be used.

In one or more embodiments of OTDR, pulses of light are transmitted into the stabilized reference optical fiber 8 and the sensing optical fiber 9. After a single light pulse is injected into the optical fibers, the optical interrogator 7 measures the reflected signal as a function of time. The time delay between the launch of the light pulse and the detection time is directly proportional to the distance from which the light scattered within the fiber. Thus, each light pulse provides strain measurements along the full length of the fiber. Each successive pulse allows the DAS box to measure variations in the strain as a function of time. Combining these two measurements provides a measurement of acoustic strains as a function of both time and position along the optical fiber.

A computer processing system 14 is in communication with the optical interrogator 7 to receive or record measured values of sensing units and to determine corresponding locations along the stabilized reference optical fiber 8 and the sensing optical fiber 9, determine correction data from the stabilized reference optical fiber 8, and apply the correction data to the measurements obtained by the sensing optical fiber 9 to provide acoustic measurement data having improved accuracy.

Figure 2:
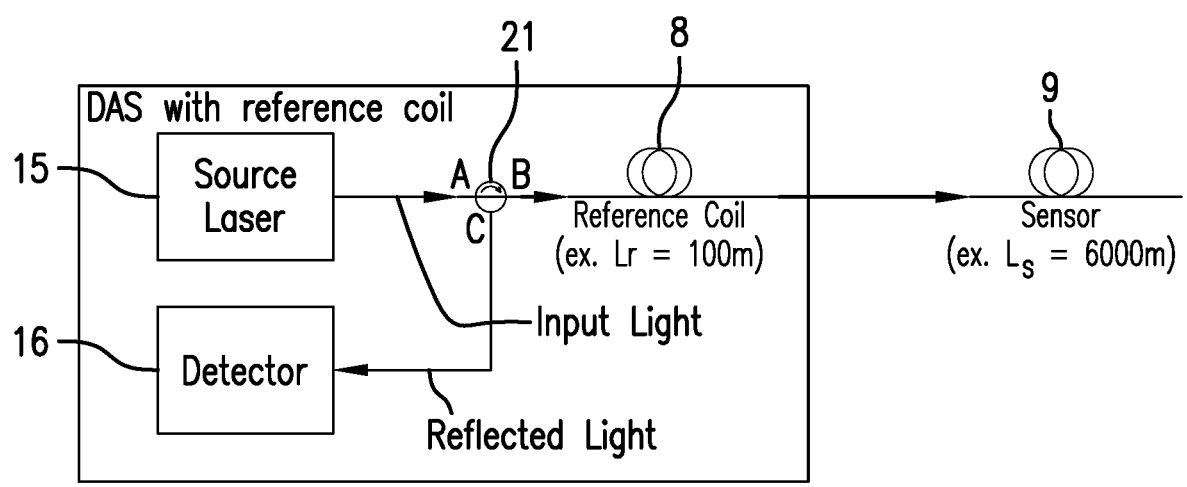
FIG. 2 depicts aspects of an embodiment of an optical fiber distributed acoustic sensing system having the optical fiber distributed sensors.

FIG. 2 illustrates an embodiment of the DAS system 10. In the embodiment of FIG. 2, laser light is emitted from the light source 15 into Port A of an optical circulator 21. The light is then emitted from Port B of the optical circulator 21 and travels to the reference optical fiber 8, which in this embodiment is in a coil. The light travels through the reference optical fiber 8 and then to the sensing optical fiber 9. As the light travels through the reference optical fiber 8 and the sensing optical fiber 9, some of that light is reflected by the reflective imperfections in the optical fiber 8, 9. The reflected light enters Port B of the optical circulator and is then emitted by Port C. From Port C, the light is received by the optical interrogator 7 to form an interference pattern, which is detected by the photo-detector 16. In the embodiment of FIG. 2, the length of the reference optical fiber 8 ($L_r$) in the coil is 100 meters while the length of the sensing optical fiber 9 is 6000 meters.

Determination and application of the correction data is now discussed. For a phase-sensitive distributed acoustic sensor, with gauge length $L_g$, laser frequency f:

$$\phi_s = 2\pi f n L_g (1+\epsilon)/c$$

where $\epsilon$ is the dynamic strain on the sensor fiber, $\phi_s$ is the resultant phase measurement, n is the index of refraction of the fiber, and c is the speed of light in a vacuum. The gauge length is generally the distance over which a strain measurement is made. In one DAS implementation, the gauge length $L_g$ is the distance between two light pulses in a fiber. These light pulses are combined to produce an interference effect. The phase difference between the two light pulses (modulus $2\pi$) is the $\varphi_s$ measurement. Another implementation uses a Michelson interferometer instead of two pulses to create a gauge length. Other DAS implementations use a local oscillator to create a virtual gauge length. All known DAS demodulation techniques may also be used.

The gauge length should not be confused with the length of the reference optical fiber 8 ($L_r$) or the length of the sensing optical fiber 9 ($L_s$). The relationship between these lengths will be discussed further below.

There are many methods to measure $\phi_z$. The correction method disclosed herein is applicable to all of these methods without modification.

DAS involve distributed sensing along the sensing optical fiber 9. The relationship presented below is applicable for all points along the measurement fiber. That is, $\phi_s$ and $\epsilon$ are both functions of the measurement locus. To simplify the analysis, only a single location along the sensing optical fiber 9 is considered, but the results hold for all $\phi_s$ and $\epsilon$.

If the source laser frequency changes by $\Delta f$, then the resultant phase becomes:

$$\phi'_s = \frac{2\pi(f + \Delta f)nL_g(1+\epsilon)}{c}.$$

The error in the phase measurement due to laser drift is:

$$\Delta\phi_s = \frac{2\pi n L_g(1+\epsilon)\Delta f}{c}.$$

For a laser with a nominal wavelength of 1550 nm, a 1 picometer change in wavelength is equivalent to a 125 MHz change in frequency. That becomes a phase change of 38.2 radians.

A correction term to remove this error is now discussed using the reference optical fiber 8. The optical fiber 8 in one or more embodiments is held in a state where temperature change is minimized, and acoustic energy is minimized. In this configuration, the strain E can be ignored. Dropping the strain, the measured phase in the reference coil becomes:

$$\phi_r = \frac{2\pi f n L_g}{c}.$$

When the laser frequency drifts, the measured phase in the reference optical fiber 8 is:

$$\phi'_r = \frac{2\pi(f + \Delta f)nL_g}{c}.$$

The change in the phase in the reference section due to laser drift is:

$$\Delta\phi_r = \frac{2\pi nL_g \Delta f}{c}.$$

With a gauge length ($L_g$) used in a DAS unit of between 1 and 50 meters, the maximum strain E upon the sensing optical fiber 9 that can be caused by acoustic waves is generally of the order of nano- or micro-strain, or $10^{-6}$.

As noted above, the error in the phase measurement in the sensor due to laser drift:

$$\Delta\phi_s = \frac{2\pi nL_g(1+\epsilon)\Delta f}{c}.$$

Since 1 is much greater than $\epsilon$ ($1 \gg \epsilon$), the strain can be ignored, yielding the approximate relationship:

$$\Delta\phi_s \approx \Delta\phi_r.$$

Hence, the sensor fiber's strain error due to laser drift can be corrected by removing the strain error $\Delta\phi_s$:

$$\phi_s \approx \phi'_s - \Delta\phi_r.$$

In one or more embodiments, the length ($L_r$) of the reference optical fiber 9 is about 100 meters. This length ($L_r$) needs to be longer than the gauge length ($L_g$) of the sensing optical fiber 9, in order for the entire gauge length to fit within the reference optical fiber 8. It is noted that the length of the reference optical fiber 8 ($L_r$) has no relationship to the length of the sensing optical fiber 9 ($L_s$) other than both are greater than or equal to the gauge length ($L_g$).

For a reference optical fiber length ($L_r$) longer than the gauge length ($L_g$), a statistical mean of the phase error over the length of the reference optical fiber 8 can improve the signal-to-noise ratio (SNR) of the correction term.

Figure 3:
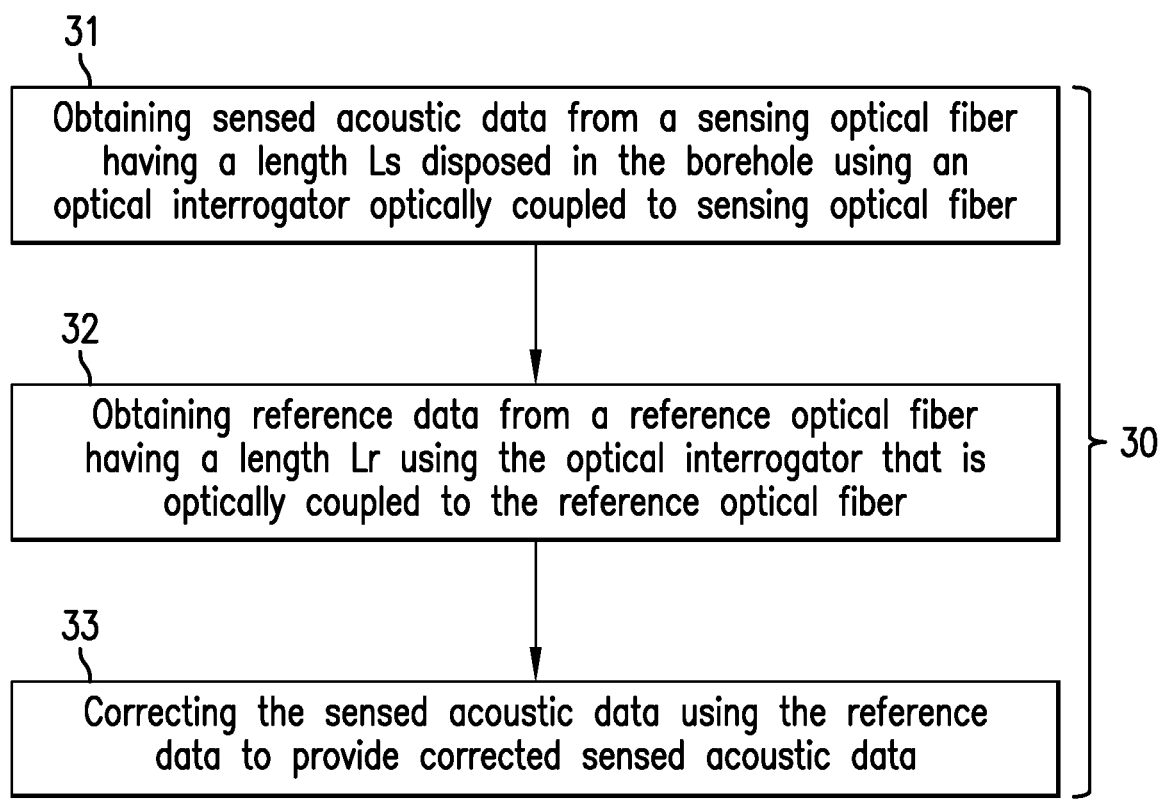
FIG. 3 is a flow chart for a method for sensing acoustic energy in a borehole penetrating the earth.

FIG. 3 is a flow chart for a method 30 for sensing acoustic energy in a borehole penetrating the earth. Block 31 calls for obtaining sensed acoustic data from a sensing optical fiber having a length Ls disposed in the borehole using an optical interrogator optically coupled to sensing optical fiber. Obtaining sensed acoustic data may include sensing the acoustic data, which is inclusive of measuring an amplitude of the acoustic energy and determining a location along the sensing optical fiber where the sensing occurred. In general, sensing may be performed by the optical interrogator using any of the optical reflectometry techniques known in the art.

Block 32 calls for obtaining reference data from a reference optical fiber having a length Lr using the optical interrogator that is optically coupled to the reference optical fiber. The reference data may be obtained similarly as to how the sensed acoustic data is obtained. In one or more embodiments, the reference optical fiber is the same type of optical fiber as the sensing optical fiber and, thus, has the same type of reflective imperfections as the sensing optical fiber.

Block 33 calls for correcting the sensed acoustic data using the reference data to provide corrected sensed acoustic data. Here, correcting may include correcting for a drift of wavelength of light transmitted by the optical interrogator. In one or more embodiments, correcting includes subtracting the effects of wavelength drift from the measurements obtained by the sensing optical fiber. With respect to this block, the reference data may include a reference phase value and the sensed acoustic data may include a sensed phase value and the drift of wavelength of the light is corrected by subtracting (i) a change in the reference phase value due to the drift of wavelength from (ii) the sensed phase value.

The method 30 may also include: transmitting light from the optical interrogator through the reference optical fiber and the sensing optical fiber; receiving light reflected by the reference optical fiber to obtain the reference data using the optical interrogator; and receiving light reflected by the sensing optical fiber to obtain the sensed acoustic data using the optical interrogator.

The method 30 may also include stabilizing the reference optical fiber by disposing the reference optical fiber in a stabilizing environment, the stabilizing environment comprising at least one of an acoustic energy absorber and insulation to limit at least one of acoustic energy contamination and temperature drift.

The method 30 may also include setting a gauge length Lg using the optical interrogator wherein the reference optical fiber has a length equal to or greater than the gauge length Lg. In one or more embodiments, the length of the reference optical fiber is inclusive of multiple gauge lengths Lg and the method 30 further comprises averaging measurements from each gauge length Lg in the reference optical fiber to provide an average reference measurement. Accordingly, the method 30 may also include determining a change in the average reference measurement and correcting each measurement in the sensing optical fiber using the change in the average reference measurement.

The disclosure herein provides several advantages. One advantage is that the apparatuses and methods disclosed herein correct data obtained from distributed acoustic sensing systems where the wavelength or frequency of light emitted from an optical interrogator can drift in order to provide acoustic sensing data. Another advantage is that the coil of reference optical fiber is compact and can be used with existing DAS systems to make more accurate readings of the sensed data.

Set forth below are some embodiments of the foregoing disclosure:

Embodiment 1: An apparatus for sensing acoustic energy in a borehole penetrating the earth, the apparatus comprising: an optical interrogator, a sensing optical fiber having a length Ls optically coupled to the optical interrogator and configured to sense the acoustic energy to provide sensed acoustic data, and a reference optical fiber having a length Lr optically coupled to the optical interrogator to provide reference data, wherein the optical interrogator corrects the sensed acoustic data using the reference data to provide corrected sensed acoustic data.

Embodiment 2: The apparatus according to any previous embodiment, wherein the sensing optical fiber and the reference optical fiber comprise reflective imperfections for Rayleigh scattering.

Embodiment 3: The apparatus according to any previous embodiment, further comprising an optical circulator configured to optically couple the optical interrogator to the sensing optical fiber and to the reference optical fiber.

Embodiment 4: The apparatus according to any previous embodiment, wherein the reference optical fiber is in series with the sensing optical fiber.

Embodiment 5: The apparatus according to any previous embodiment, wherein the reference optical fiber is disposed between the optical interrogator and the sensing optical fiber.

Embodiment 6: The apparatus according to any previous embodiment, wherein the reference optical fiber is in a coil.

Embodiment 7: The apparatus according to any previous embodiment, further comprising a stabilizer environment that contains the reference optical fiber, the stabilizer environment comprising at least one of an acoustic energy absorber and insulation to limit at least one of acoustic energy contamination and temperature drift.

Embodiment 8: The apparatus according to any previous embodiment, wherein the optical interrogator interrogates the reference optical fiber and the sensing optical fiber with a gauge length Lg.

Embodiment 9: The apparatus according to any previous embodiment, wherein the gauge length Lg is a distance between two successive light pulses emitted by the optical interrogator.

Embodiment 10: The apparatus according to any previous embodiment, wherein $L_r$ is greater than or equal to Lg.

Embodiment 11: The apparatus according to any previous embodiment, wherein the optical interrogator corrects for drift of frequency of light emitted by the optical interrogator.

Embodiment 12: The apparatus according to any previous embodiment, wherein the reference data comprises a reference phase value and the sensed acoustic data comprises a sensed phase value and the drift of frequency of the light is corrected by subtracting (i) a change in the reference phase value due to the drift of frequency from (ii) the sensed phase value.

Embodiment 13: The apparatus according to any previous embodiment, wherein the sensing optical fiber and the reference optical fiber comprise fiber Bragg gratings.

Embodiment 14: A method for sensing acoustic energy in a borehole penetrating the earth, the method comprising: obtaining sensed acoustic data from a sensing optical fiber having a length Ls disposed in the borehole using an optical interrogator optically coupled to sensing optical fiber, obtaining reference data from a reference optical fiber having a length Lr using the optical interrogator that is optically coupled to the reference optical fiber, and correcting the sensed acoustic data using the reference data to provide corrected sensed acoustic data.

Embodiment 15: The method according to any previous embodiment, further comprising stabilizing the reference optical fiber by disposing the reference optical fiber in a stabilizing environment, the stabilizing environment comprising at least one of an acoustic energy absorber and insulation to limit at least one of acoustic energy contamination and temperature drift.

Embodiment 16: The method according to any previous embodiment, further comprising: transmitting light from the optical interrogator through the reference optical fiber and the sensing optical fiber, receiving light reflected by the reference optical fiber to obtain the reference data using the optical interrogator; and receiving light reflected by the sensing optical fiber to obtain the sensed acoustic data using the optical interrogator.

Embodiment 17: The method according to any previous embodiment, wherein the optical interrogator corrects for a drift of frequency of the light transmitted by the optical interrogator.

Embodiment 18: The method according to any previous embodiment, wherein the reference data comprises a reference phase value and the sensed acoustic data comprises a sensed phase value and the drift of frequency of the light is corrected by subtracting (i) a change in the reference phase value due to the drift of frequency from (ii) the sensed phase value.

Embodiment 19: The method according to any previous embodiment, further comprising: setting a gauge length Lg using the optical interrogator, wherein the reference optical fiber has a length equal to or greater than the gauge length Lg.

Embodiment 20: The method according to any previous embodiment, wherein the length of the reference optical fiber is inclusive of multiple gauge lengths Lg and the method further comprises averaging measurements from each gauge length Lg in the reference optical fiber to provide an average reference measurement.

Embodiment 21: The method according to any previous embodiment, further comprising determining a change in the average reference measurement and correcting each measurement in the sensing optical fiber using the change in the average reference measurement.

In support of the teachings herein, various analysis components may be used, including a digital and/or an analog system. For example, the optical interrogator 7 and/or the computer processing system 14 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply, magnet, electromagnet, sensor, electrode, transmitter, receiver, transceiver, antenna, controller, optical unit or components, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured.

The flow diagram depicted herein is just an example. There may be many variations to this diagram or the steps (or operations) described therein without departing from the scope of the invention. For example, operations may be performed in another order or other operations may be performed at certain points without changing the specific disclosed sequence of operations with respect to each other. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for sensing acoustic energy in a borehole penetrating the earth, the apparatus comprising:
    an optical interrogator comprising a light source that emits light at a frequency,
    a sensing optical fiber having a length Ls optically coupled to the optical interrogator and configured to sense the acoustic energy to provide sensed acoustic data, the sensing optical fiber having a gauge length Lg over which a strain measurement is made; and
    a reference optical fiber having a length Lr optically coupled to the optical interrogator to provide reference data, wherein the length Lr is greater than or equal to the gauge length Lg; and
    a processor that receives the sensed acoustic data and the reference data and is configured to implement an algorithm comprising one or more equations to remove a phase measurement error in the sensed acoustic data due to drift Δf in the frequency f of the light emitted by the light source to provide sensed acoustic energy data with reduced error, the one or more equations comprising an index of refraction of the sensing optical fiber and an index of refraction of the reference optical fiber;
    wherein the algorithm implements the following equations:

$$\phi_s \approx \phi'_s - \Delta\phi_r,$$

$$\phi'_s = \frac{2\pi(f + \Delta f)nL_g(1 + \epsilon)}{c}, \text{ and}$$

$$\Delta\phi_r = \frac{2\pi nL_g \Delta f}{c},$$

wherein:
    $\phi_s$ represents phase measurement of sensed acoustic energy with reduced error;
    $\phi'_s$ represents resultant phase measurement of sensed acoustic energy due to frequency drift of the light source;
    $\Delta\phi_r$ represents change in phase in the reference optical fiber due to frequency drift of the light source;
    n represents index of refraction of corresponding optical fiber;
    $L_g$ represents gauge length;
    $\epsilon$ represents dynamic strain on the sensing optical fiber;
    $\Delta f$ represents drift in frequency of light emitted by the light source; and
    c represents the speed of light.

2. The apparatus according to claim 1, wherein the sensing optical fiber and the reference optical fiber comprise reflective imperfections for Rayleigh scattering.

3. The apparatus according to claim 1, further comprising an optical circulator configured to optically couple the optical interrogator to the sensing optical fiber and to the reference optical fiber.

4. The apparatus according to claim 1, wherein the reference optical fiber is directly in series with the sensing optical fiber with no intervening optical device.

5. The apparatus according to claim 4, wherein the reference optical fiber is disposed between the optical interrogator and the sensing optical fiber.

6. The apparatus according to claim 1, wherein the reference optical fiber is in a coil.

7. The apparatus according to claim 6, further comprising a stabilizer environment that contains the reference optical fiber, the stabilizer environment comprising at least one of an acoustic energy absorber and insulation to limit at least one of acoustic energy contamination and temperature drift.

8. The apparatus according to claim 1, wherein the optical interrogator interrogates the reference optical fiber and the sensing optical fiber with the gauge length Lg.

9. The apparatus according to claim 4, wherein the gauge length Lg is a distance between two successive light pulses emitted by the optical interrogator.

10. The apparatus according to claim 1, wherein the optical interrogator corrects for drift of frequency of light emitted by the optical interrogator.

11. The apparatus according to claim 10, wherein the reference data comprises a reference phase value and the sensed acoustic data comprises a sensed phase value and the drift of frequency of the light is corrected by subtracting (i)

a phase error resulting from strain error due to the drift of frequency from (ii) the sensed phase value.

12. The apparatus according to claim 1, wherein the sensing optical fiber and the reference optical fiber comprise fiber Bragg gratings.

13. A method for sensing acoustic energy in a borehole penetrating the earth, the method comprising:
obtaining sensed acoustic data from a sensing optical fiber having a length Ls disposed in the borehole using an optical interrogator optically coupled to sensing optical fiber, the optical interrogator emitting light from a light source at a frequency f the sensing optical fiber having a gauge length Lg over which a strain measurement is made;
obtaining reference data from a reference optical fiber having a length Lr using the optical interrogator that is optically coupled to the reference optical fiber, wherein the length Lr is greater than or equal to the gauge length Lg; and
processing, by a processor, the sensed acoustic data using the reference data by implementing an algorithm comprising an one or more equations to remove a phase measurement error in the sensed acoustic data due to drift $\Delta f$ in the frequency f of the light emitted by the light source to provide sensed acoustic energy data with reduced error, the one or more equations comprising an index of refraction of the sensing optical fiber and an index of refraction of the reference optical fiber;
wherein the algorithm implements the following equations:

$$\phi_s \approx \phi'_s - \Delta\phi_r,$$

$$\phi'_s = \frac{2\pi(f + \Delta f)nL_g(1 + \epsilon)}{c}, \text{ and}$$

$$\Delta\phi_r = \frac{2\pi nL_g \Delta f}{c},$$

wherein:
$\phi_s$, represents phase measurement of sensed acoustic energy with reduced error;
$\phi'_s$ represents resultant phase measurement of sensed acoustic energy due to frequency drift of the light source;
$\Delta\phi_r$ represents change in phase in the reference optical fiber due to frequency drift of the light source;
n represents index of refraction of corresponding optical fiber;
$L_g$ represents gauge length;
$\epsilon$ represents dynamic strain on the sensing optical fiber;
$\Delta f$ represents drift in frequency of light emitted by the light source; and
c represents the speed of light.

14. The method according to claim 13, further comprising stabilizing the reference optical fiber by disposing the reference optical fiber in a stabilizing environment, the stabilizing environment comprising at least one of an acoustic energy absorber and insulation to limit at least one of acoustic energy contamination and temperature drift.

15. The method according to claim 13, further comprising:
transmitting light from the optical interrogator through the reference optical fiber and the sensing optical fiber;
receiving light reflected by the reference optical fiber to obtain the reference data using the optical interrogator; and
receiving light reflected by the sensing optical fiber to obtain the sensed acoustic data using the optical interrogator.

16. The method according to claim 15, wherein the optical interrogator corrects for a drift of frequency of the light transmitted by the optical interrogator.

17. The method according to claim 16, wherein the reference data comprises a reference phase value and the sensed acoustic data comprises a sensed phase value and the drift of frequency of the light is corrected by subtracting (i) a change in the reference phase value due to the drift of frequency from (ii) the sensed phase value.

18. The method according to claim 13, further comprising:
setting the gauge length Lg using the optical interrogator.

19. The method according to claim 18, wherein the length of the reference optical fiber is inclusive of multiple gauge lengths Lg and the method further comprises averaging measurements from each gauge length Lg in the reference optical fiber to provide an average reference measurement.

20. The method according to claim 19, further comprising determining a change in the average reference measurement and correcting each measurement in the sensing optical fiber using the change in the average reference measurement.

21. The method according to claim 13, wherein the reference optical fiber is directly in series with the sensing optical fiber with no intervening optical device and the gauge length Lg is a distance between two successive light pulses emitted by the optical interrogator.

* * * * *